(12) United States Patent
Slottskog et al.

(10) Patent No.: US 11,148,657 B2
(45) Date of Patent: Oct. 19, 2021

(54) METHOD FOR HEATING AN EXHAUST AFTERTREATMENT SYSTEM AND A HYBRID VEHICLE ADAPTED TO HEAT AN EXHAUST AFTERTREATMENT SYSTEM

(71) Applicant: Volvo Car Corporation, Gothenburg (SE)

(72) Inventors: Daniel Slottskog, Gothenburg (SE); Jan Krysell, Gothenburg (SE); Richard Sebestyen, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 237 days.

(21) Appl. No.: 16/142,121

(22) Filed: Sep. 26, 2018

(65) Prior Publication Data

US 2019/0118794 A1 Apr. 25, 2019

(30) Foreign Application Priority Data

Oct. 24, 2017 (EP) ..................................... 17197979

(51) Int. Cl.

| | |
|---|---|
| *B60W 20/16* | (2016.01) |
| *F01N 11/00* | (2006.01) |
| *F01N 3/20* | (2006.01) |
| *B60W 10/26* | (2006.01) |
| *B60W 10/30* | (2006.01) |

(Continued)

(52) U.S. Cl.
CPC ............ *B60W 20/16* (2016.01); *B60W 10/06* (2013.01); *B60W 10/08* (2013.01); *B60W 10/26* (2013.01);

(Continued)

(58) Field of Classification Search
CPC ...... B60W 20/16; B60W 10/26; B60W 10/30; B60W 10/06; B60W 10/08;

(Continued)

(56) References Cited

U.S. PATENT DOCUMENTS

| | | | | |
|---|---|---|---|---|
| 5,345,761 | A * | 9/1994 | King ..................... | B60W 10/26 60/274 |
| 6,057,605 | A * | 5/2000 | Bourne .................. | B60K 6/485 290/40 C |

(Continued)

FOREIGN PATENT DOCUMENTS

| | | |
|---|---|---|
| CN | 106438065 A | 2/2005 |
| CN | 101368532 A | 2/2009 |

(Continued)

OTHER PUBLICATIONS

May 4, 2018 European Search Report issue on International Application No. EP17197979.

(Continued)

*Primary Examiner* — Genna M Mott
(74) *Attorney, Agent, or Firm* — Clements Bernard Walker; Christopher L. Bernard

(57) ABSTRACT

Method for heating an exhaust aftertreatment system in a hybrid vehicle comprising an internal combustion engine and an electric machine, comprising the steps of measuring an exhaust condition for the function of the exhaust aftertreatment system, determining if the exhaust condition is below a predefined limit, applying a load from the electric machine on the internal combustion engine when the temperature is below the predefined limit, in order to increase the combustion engine torque, charging the battery system of the vehicle with power from the electric machine, and disconnecting the electric machine from the internal combustion engine when the exhaust condition for the function of the exhaust aftertreatment system is above the predefined (Continued)

limit. The advantage of the invention is that the heating of an exhaust aftertreatment system after a cold start of a hybrid vehicle can be improved, such that the exhaust emission of the vehicle can be minimized.

8 Claims, 2 Drawing Sheets

(51) Int. Cl.
*F01N 13/00* (2010.01)
*B60W 10/06* (2006.01)
*F01N 3/021* (2006.01)
*B60W 10/08* (2006.01)
*F01N 3/027* (2006.01)

(52) U.S. Cl.
CPC ............ *B60W 10/30* (2013.01); *F01N 3/021* (2013.01); *F01N 3/027* (2013.01); *F01N 3/2006* (2013.01); *F01N 3/2013* (2013.01); *F01N 11/002* (2013.01); *F01N 11/007* (2013.01); *F01N 13/009* (2014.06); *B60W 2510/068* (2013.01); *B60W 2510/244* (2013.01); *B60W 2530/12* (2013.01); *B60W 2710/0666* (2013.01); *B60W 2710/08* (2013.01); *B60W 2710/244* (2013.01); *F01N 2590/11* (2013.01)

(58) Field of Classification Search
CPC ......... B60W 2710/08–088; B60W 2710/0666; F01N 13/009; F01N 3/2006; F01N 3/021; F01N 3/027; F01N 11/007; F01N 11/002; F01N 3/2013; B60K 6/22; F02N 11/04; F02N 11/0829; F02N 11/0862
See application file for complete search history.

(56) References Cited

U.S. PATENT DOCUMENTS

| | | | | |
|---|---|---|---|---|
| 6,657,315 | B1* | 12/2003 | Peters | B60K 6/485 290/40 C |
| 7,007,460 | B2* | 3/2006 | Frieden | F01N 3/2006 60/284 |
| 7,040,269 | B2* | 5/2006 | Dehrmann | F02D 41/068 123/142.5 R |
| 2003/0196631 | A1* | 10/2003 | Dehrmann | F02D 41/068 123/192.1 |
| 2005/0034449 | A1* | 2/2005 | Frieden | F01N 3/2006 60/284 |
| 2005/0034451 | A1 | 2/2005 | Miyashita | |
| 2009/0044520 | A1 | 2/2009 | Farell et al. | |
| 2011/0035136 | A1* | 2/2011 | Niimi | F02D 29/02 701/110 |
| 2012/0173062 | A1 | 7/2012 | Madurai et al. | |
| 2012/0304622 | A1* | 12/2012 | Verbrugge | B60W 10/30 60/274 |
| 2013/0047607 | A1* | 2/2013 | Petrovic | F02D 21/08 60/605.2 |
| 2014/0047817 | A1 | 2/2014 | Vigild et al. | |
| 2018/0266349 | A1* | 9/2018 | Almkvist | F02D 41/0255 |

FOREIGN PATENT DOCUMENTS

CN 103590881 A 2/2014
DE 2016219038 A1 5/2017

OTHER PUBLICATIONS

Office action and search report issued in the corresponding CN application No. 201811242794.7.

* cited by examiner

METHOD FOR HEATING AN EXHAUST AFTERTREATMENT SYSTEM AND A HYBRID VEHICLE ADAPTED TO HEAT AN EXHAUST AFTERTREATMENT SYSTEM

CROSS-REFERENCE TO RELATED APPLICATION

The present patent application/patent claims the benefit of priority of co-pending European Patent Application No. 17197979.2, filed on Oct. 24, 2017, and entitled "METHOD FOR HEATING AN EXHAUST AFTERTREATMENT SYSTEM AND A HYBRID VEHICLE ADAPTED TO HEAT AN EXHAUST AFTERTREATMENT SYSTEM," the contents of which are incorporated in full by reference herein.

TECHNICAL FIELD

The present invention relates to a method for heating an exhaust aftertreatment system of a hybrid vehicle comprising an internal combustion engine.

BACKGROUND

Vehicles comprising an internal combustion engine are subjected to a plurality of different legislative requirements and regulations. Some of these requirements and regulations are directed to fuel consumption and exhaust emission. Different countries or markets may have different requirements, but most include a specific test cycle that is supposed to give an indication of the fuel consumption and exhaust emission of the vehicle. However, there is normally a discrepancy between the fuel consumption and exhaust emission measured in a test cycle and the same measured in real world driving conditions.

A real world cold start is normally performed in a large temperature interval, which may start at −40 degrees Celsius and may end at 40 degrees Celsius. During a cold start, the fuel consumption will be higher, mainly due to higher friction in the engine and in the transmission. The exhaust emission will also be higher, mainly due to that the exhaust aftertreatment system has not reached the optimal working temperature.

In order to minimize the exhaust emissions when the vehicle is started, it is known to run the engine with suboptimal combustion parameters, i.e. the combustion is run with more fuel than necessary and the ignition is adjusted to ignite the fuel mixture with a non-optimal timing. In this way, more heat is produced by the internal combustion engine which will heat the exhaust aftertreatment system in a faster way, such that the exhaust aftertreatment system can start to reduce exhaust emissions as quick as possible. Such a method works well most of the time, but there are energy losses.

There is thus room for a method that improves the heating of the exhaust aftertreatment system of a hybrid vehicle.

SUMMARY OF THE INVENTION

An object of the invention is therefore to provide an improved method for heating the exhaust aftertreatment system of a hybrid vehicle. A further object of the invention is to provide a hybrid vehicle that is adapted to heat the exhaust aftertreatment system in an improved way.

The solution to the problem according to the invention is described herein, along with advantageous further developments of the inventive method and vehicle, as well as a computer program and a computer program product for performing such a method.

In a method for heating an exhaust aftertreatment system in a hybrid vehicle comprising an internal combustion engine and an electric machine, the steps of determining the exhaust condition for the function of the exhaust aftertreatment system, determining if the exhaust condition is below a predefined limit, applying a load from the electric machine on the internal combustion engine when the exhaust condition is below the predefined limit, in order to increase the combustion engine torque, charging the battery system of the vehicle with power from the electric machine, disconnecting the electric machine from the internal combustion engine when the exhaust condition for the function of the exhaust aftertreatment system is above the predefined limit are comprised.

By this first embodiment of the method, the method will allow the exhaust aftertreatment system of an internal combustion engine to be heated in a quick way, while at the same time preserving energy by charging a battery. Normally, the ignition and the fuel injection of an internal combustion engine is adjusted such that the internal combustion engine does not run in an optimal way, which will produce excessive heat that will heat the exhaust aftertreatment system, which may be a catalytic converter. In this way, the catalytic converter heats up faster than it would if the internal combustion engine was run with optimal ignition and injection parameters. This will however use additional energy, which is lost.

In the inventive solution, an electric machine is used to apply an additional load on the internal combustion engine, which will allow the internal combustion engine to deliver increased torque. At the same time, more heat will be produced which will heat the exhaust aftertreatment system. The electric machine will at the same time produce electric energy, which is used to charge the battery system of the vehicle. In this way, most of the energy used to heat the exhaust aftertreatment system can be preserved and less energy is thus lost.

In one example, the battery system is charged by the electric machine. In many cases, the additional heating of the exhaust aftertreatment system is performed right after the internal combustion engine has been started, during the warm up phase of the internal combustion engine. In some cases, the vehicle has been parked for a longer time connected to a charge station, and the battery system may be fully charged. Depending on the State of Charge (SOC) of the battery, there may be headroom for additional charge of the battery system when the vehicle is started, depending on the allowed SOC limit for the battery during long term charging. In some cases, the allowed SOC for a battery system may be 80-90% of the theoretical SOC value during charging, in order to preserve the battery when the battery is charged at a charge station. The additional headroom can then be used for regenerative charging when the vehicle is driven.

In another example, when the SOC of the battery is above a predefined limit, the additional electric energy from the electric motor is used to heat the exhaust aftertreatment system by using an electric heater arranged in the exhaust aftertreatment system. This will allow the exhaust aftertreatment system to heat up even faster, which will preserve some fuel. It is also possible to heat the air intake with an electric heater in order to heat the intake air.

In one example, the exhaust aftertreatment system comprises a catalytic converter. The catalytic converter is provided with an electric heater mounted inside the catalytic converter, preferably at the section closest to the inlet of the catalytic converter. In this way, the exhaust gases will transfer heat from the electric heater to the substrate of the catalytic converter. The exhaust aftertreatment system may also comprise a particulate filter provided with an electrical heater, which may be heated with excessive electric energy in order for the particulate filter to reach its regeneration temperature.

In a hybrid vehicle, comprising an internal combustion engine, an electric machine, a battery system, a converter unit and an exhaust aftertreatment system, the object of the invention is achieved in that the electric machine is adapted to apply a load to the internal combustion engine when the exhaust condition for the function of the exhaust aftertreatment system is below a predefined limit, and where the converter unit is adapted to charge the battery system with energy from the electric machine until the exhaust condition for the function of the exhaust aftertreatment system reaches the predefined limit.

By this first embodiment of a hybrid vehicle according to the invention, a vehicle is provided where the energy losses during heating of the exhaust aftertreatment system can be reduced. The electric machine will apply a load to the internal combustion engine such that the torque of the internal combustion engine is increased. The exhaust gases will thus heat up faster which will bring the exhaust aftertreatment system to its working temperature quicker. The energy produced by the electric machine is used to charge the battery system of the hybrid vehicle.

BRIEF DESCRIPTION OF THE DRAWINGS

The invention will be described in greater detail in the following, with reference to the attached drawings, in which.

DETAILED DESCRIPTION OF THE INVENTION

The embodiments of the invention with further developments described in the following are to be regarded only as examples and are in no way to limit the scope of the protection provided by the patent claims.

Figure 1:
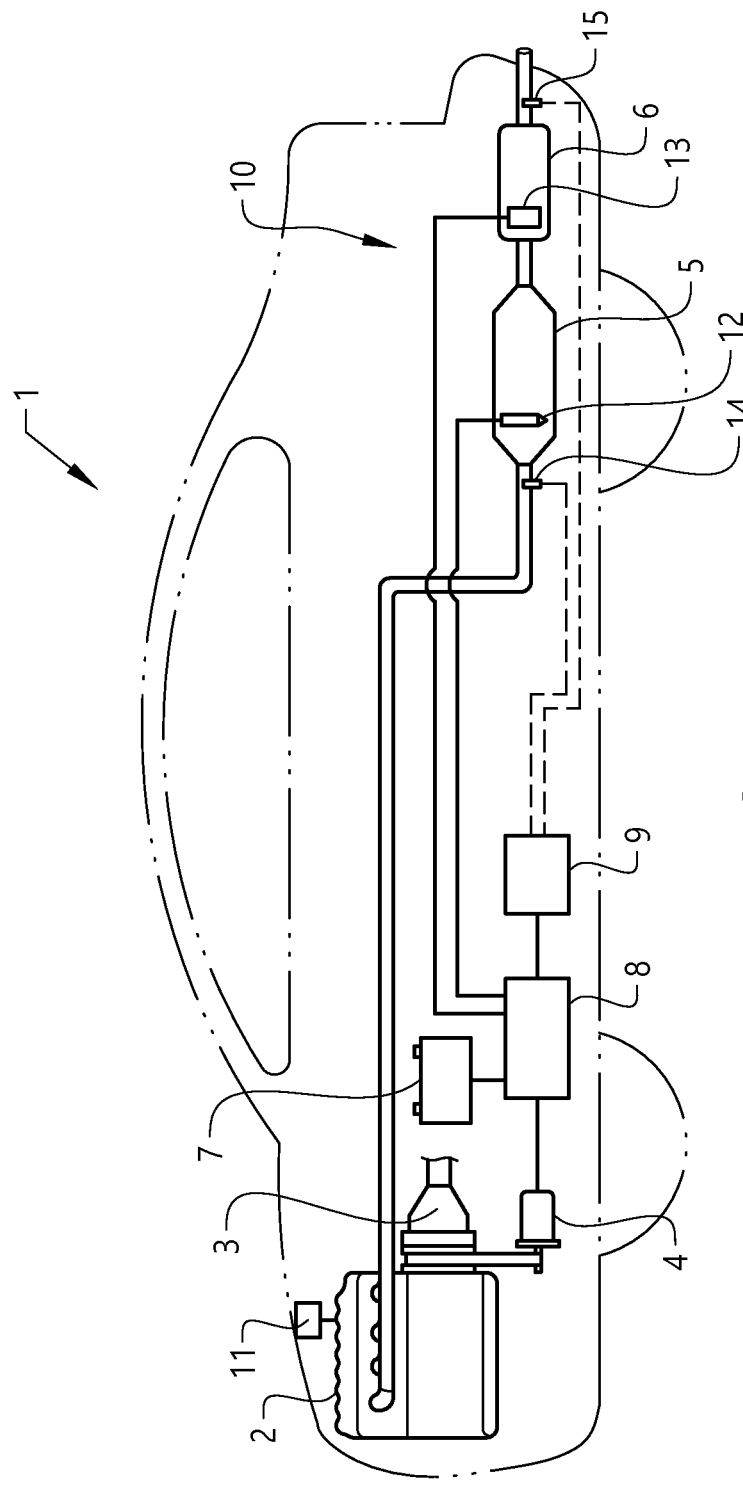
FIG. 1 shows a schematic vehicle according to the invention.

FIG. 1 shows a schematic hybrid vehicle 1 which is powered by an internal combustion engine 2 and an electric machine 4. The internal combustion engine 2 is provided with a transmission 3 arranged between the internal combustion engine and the drive wheels of the vehicle. The transmission 3 may be a manual gearbox, an automatic gearbox or an automated shifting manual gearbox. The electric machine is rotationally connected to the internal combustion engine and is preferably arranged to act on the crank shaft of the engine, and is in the shown example arranged before the transmission. The electric machine may e.g. be an integrated starter generator arrangement, and may be connected to the internal combustion engine with a belt in an offset configuration. The electric machine could also be arranged at other positions of the vehicle if the method is to be performed during driving of the vehicle, such as at a rear axle or at separate wheels. The internal combustion engine 2 may be a diesel engine, a gasoline engine or an engine using liquefied natural gas or compressed natural gas.

The exhaust system of the hybrid vehicle comprises a catalytic converter 5 and may also comprise a particulate filter 6 which are mounted at the exhaust pipe of the vehicle. The hybrid vehicle comprises a battery system 7 which is adapted to power the electric machine when the electric machine is used as an electric motor. The battery system is further adapted to be charged by the electric machine when the electric machine is used as a generator, or from the grid by a charge station. The nominal voltage of the battery system is at least 48 volts and is preferably in the region between 200-300 Volts. In the shown example, a passenger car is used as an example of a hybrid vehicle.

The catalytic converter 5 is provided with an electrical heater 12 which can be powered by the electric machine or by the battery system through a converter unit 8 controlled by a control unit 9. The converter unit is connected to the electric machine and to the battery system and converts the voltage from the electric machine to the battery system and from the battery system to the electric machine. The electric machine may e.g. be a three-phase electric machine and the battery system is a direct current battery. The converter unit will function as an AC/DC converter and may also convert the voltage level. The converter unit is controlled by a control unit 9 which may be a stand-alone unit or which may be integrated in another control unit of the vehicle, or may be integrated in the converter unit. The electrical heater 12 is preferably mounted inside the catalytic converter, preferably at the section closest to the inlet of the catalytic converter in order to optimize the performance of the catalytic converter.

In the shown example, the hybrid vehicle 1 comprises a particulate filter 6 which is provided with an electric heater 13 adapted to heat the particulate filter from the electric machine. The particulate filter is adapted to the fuel used by the vehicle. In a vehicle comprising a diesel engine, a diesel particulate regeneration filter is used to reduce the amount of soot in the exhaust gas. In a vehicle comprising a gasoline engine, a particulate filter may also be used to reduce the amount of particles in the exhaust gas, if required by legislative regulations. The control unit 9 can measure an exhaust condition for the function of the exhaust aftertreatment system with a first exhaust sensor 14. A second exhaust sensor 15 can be used to measure the result of the exhaust aftertreatment system, i.e. the function of the exhaust aftertreatment system. The first exhaust sensor 14 is positioned before the exhaust aftertreatment system 10 and the second exhaust sensor 15 is positioned after the exhaust aftertreatment system 10.

When the vehicle is cold started, i.e. started when the engine is cold and when the vehicle has not been driven for a longer time, the exhaust aftertreatment system will be cold and the catalyst converter will not be able to reduce the NOx level of the exhaust emissions. The control unit will detect that the exhaust condition for the function of the exhaust aftertreatment system is below a predefined limit, and will apply a load from the electric machine to the internal combustion engine, such that the torque of the internal combustion engine is raised. This will produce more hot exhaust gases which will heat the exhaust aftertreatment system, which in the shown example is the catalyst converter. When the exhaust condition for the function of the exhaust aftertreatment system has reached the predefined limit, the catalyst converter will function properly and will reduce NOx emissions. The exhaust condition for the function of the exhaust aftertreatment system may be based on at least one of the following parameters; exhaust gas temperature, exhaust gas soot, exhaust gas NOx, exhaust gas flow.

The exhaust sensor 14 may comprise several different sensor elements adapted to measure different parameters. One or more values from the exhaust sensor are read by the control unit 9, and an exhaust condition is determined by the control unit.

The battery system will in a first example be charged by the electric machine when the electric machine applies an excessive load on the internal combustion engine. In this example, the battery system has been charged during the still-stand by an external charger station and is fully charged. In some cases, a fully charged battery may have a certain headroom such that the theoretical SOC value is not utilized completely when charging the battery system by a charger station. By avoiding charging the battery to a SOC level of 100%, the life of the battery system is prolonged. The SOC level of a battery system fully charged by a charger station may be in the range between 80-90% of the theoretical SOC value. The additional headroom can be used for regenerative charging when the vehicle is driven, which reduces the risk of overcharging the battery. In the first example, the battery system is charged by the electric machine. The additional charge of the battery can later be used e.g. to power the vehicle when driven in a hybrid mode, where the electric machine acts as an electric motor.

In another example, the battery system has been charged during the still-stand by an external charger station and is fully charged. In this case, the battery system is charged to a higher level, e.g. to a SOC level above 90% of the theoretical SOC value. There is in this example limited amount of charge headroom, and the battery system will thus not be charged by the electric machine. Instead, the additional energy from the electric machine will be used to heat the catalytic converter by the electric heater mounted in the catalytic converter. This will allow the exhaust aftertreatment system to heat up even faster, which will preserve some fuel.

In another example, a particulate filter may be heated by the additional electric energy from the electric machine, or the air intake is heated with an electric heater 11.

When the vehicle is restarted and the engine is warm, the control unit measures the exhaust condition for the function of the exhaust aftertreatment system. If the exhaust condition is above a predefined limit, there is no need to apply an additional torque to the internal combustion engine by the electric machine, since the exhaust aftertreatment system will be able to reduce NOx right from the start. In this case, the battery system is not charged by the electric machine.

Figure 2:
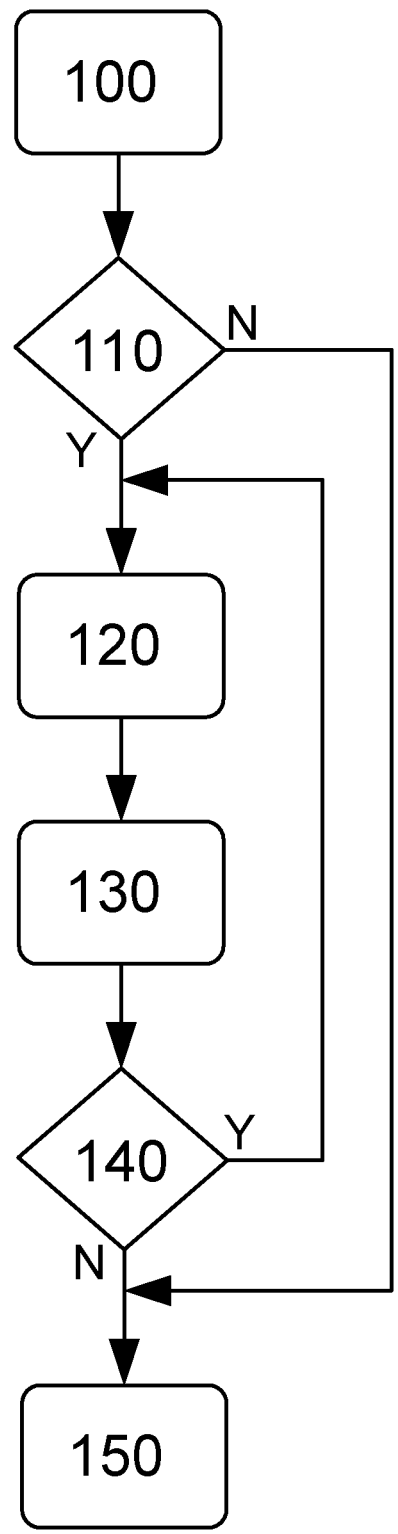
FIG. 2 shows a schematic flow chart of an inventive method for heating an exhaust aftertreatment system of a hybrid vehicle.

FIG. 2 shows a schematic flow chart of the method for heating an exhaust aftertreatment system in a hybrid vehicle. The method is performed when the vehicle has been started, either when it is cold started or restarted with a warm engine. The method steps are preferably performed by a computer program and a computer program product contained and run in the electronic control unit of the vehicle.

In step 100, the exhaust condition for the function of the exhaust aftertreatment system is determined by a control unit, based on measurements from an exhaust sensor mounted at the exhaust aftertreatment system. The exhaust sensor measures one or more of the exhaust gas temperature, the exhaust gas soot, the exhaust gas NOx and/or the exhaust gas flow. The exhaust aftertreatment system is often a catalytic converter, which is provided with an exhaust sensor at the inlet of the catalytic converter.

In step 110, it is determined if the exhaust condition for the function of the exhaust aftertreatment system is below a predefined limit. The predefined limit may e.g. be based on the lowest working temperature of the exhaust aftertreatment system or on the NOx level in the exhaust gas. If the exhaust condition is below the predefined limit, the method continues with step 120, otherwise the method continues with step 150, i.e. no additional heating of the exhaust aftertreatment system is required.

In step 120, a load from the electric machine is applied on the internal combustion engine, in order to increase the internal combustion engine torque. This additional load will increase the exhaust gas temperature, such that the exhaust aftertreatment system will heat up faster.

In step 130, the battery system of the vehicle is charged with power from the electric machine. This continues until the exhaust condition for the function of the exhaust aftertreatment system has reached the predefined limit, e.g. where the working temperature of the exhaust aftertreatment system is reached.

In step 140, the exhaust condition for the function of the exhaust aftertreatment system is compared to the predefined limit. If the exhaust condition for the function of the exhaust aftertreatment system is lower than the predefined limit, the charging of the battery continues. When the exhaust condition for the function of the exhaust aftertreatment system is equal to the predefined limit, the working condition of the exhaust aftertreatment system is reached, e.g. the working temperature of the catalytic converter is reached. The method is then terminated at step 150.

The invention is not to be regarded as being limited to the embodiments described above, a number of additional variants and modifications being possible within the scope of the subsequent patent claims.

What is claimed is:

1. A method for heating an exhaust aftertreatment system in a hybrid vehicle comprising an internal combustion engine and an electric machine, comprising the following steps:
    measuring an exhaust condition for a function of the exhaust aftertreatment system,
    determining if the exhaust condition is below a predefined limit,
    applying a load from the electric machine on the internal combustion engine when the exhaust condition is below the predefined limit, in order to increase the combustion engine torque,
    charging a battery system of the vehicle with power from the electric machine when the electric machine applies an excessive load on the internal combustion engine and when the state of charge level of the battery system has additional headroom for regenerative charging,
    heating a catalytic converter of the exhaust aftertreatment system with additional power directly from the electric machine using an electric heater integrated in the catalytic converter at the section closest to the inlet of the catalytic converter and heating a particulate filter of the exhaust aftertreatment system with power from the electric machine using an electric heater integrated in the filter when the state of charge of the battery system is above a predefined state of charge limit being indicative of a fully charged battery, whereby the battery system will not be charged by the electric machine, and
    disconnecting the electric machine from the internal combustion engine when the exhaust condition for the function of the exhaust aftertreatment system is above the predefined limit.

2. The method according to claim 1, wherein the exhaust condition includes one or more of exhaust gas temperature, exhaust gas soot, exhaust gas NOx, and exhaust gas flow.

3. The method according to claim 1, wherein the method further comprises the step of heating an air intake with power from the electric machine when the state of charge of the battery system is above the predefined state of charge limit.

4. The method according to claim 1, wherein the method further comprises the step of heating the exhaust aftertreatment system with power from the electric machine when the state of charge of the battery system is above the predefined state of charge limit and the exhaust condition for the function of the exhaust aftertreatment system is above the predefined limit.

5. The method according to claim 1, wherein the exhaust condition is measured with an exhaust sensor positioned before the exhaust aftertreatment system.

6. The method according to claim 1, wherein the exhaust condition is measured with an exhaust sensor positioned after the exhaust aftertreatment system.

7. A hybrid vehicle, comprising:
an internal combustion engine, an electric machine, a battery system, a converter unit, and an exhaust aftertreatment system, wherein the electric machine is adapted to apply a load to the internal combustion engine when an exhaust condition for a function of the exhaust aftertreatment system is below a predefined limit, and wherein the converter unit is adapted to charge the battery system with energy from the electric machine until the exhaust condition for the function of the exhaust aftertreatment system reaches the predefined limit when the electric machine applies an excessive load on the internal combustion engine and when the state of charge level of the battery system has additional headroom for regenerative charging, wherein the electric machine is adapted to directly heat a catalytic converter of the exhaust aftertreatment system with additional power using an electric heater integrated in the catalytic converter at the section closest to the inlet of the catalytic converter and to heat a particulate filter of the exhaust aftertreatment system with power from the electric machine using an electric heater integrated in the filter when the state of charge of the battery system is above a predefined state of charge limit being indicative of a fully charged battery, whereby the electric machine is configured to stop charging the battery system.

8. The vehicle according to claim 7, wherein the catalytic converter is adapted to be heated by the electrical heater with the energy from the electric machine when the exhaust condition for the function of the exhaust aftertreatment system is below the predefined limit and when the state of charge of the battery system is above the predefined state of charge limit.

* * * * *